(No Model.)

G. HOLLER
JAW TRAP.

No. 430,231. Patented June 17, 1890.

Witnesses
H. L. Newman.
J. E. Wayson.

Inventor
Georg Holler
By his Attorneys
Wm. H. Bates

THE NORRIS PETERS CO., PHOTO-LITHO., WASHINGTON, D. C.

UNITED STATES PATENT OFFICE.

GEORG HOLLER, OF BLOSSBURG, ASSIGNOR OF ONE-HALF TO CHARLES H. PHILPOTT, OF RATON, TERRITORY OF NEW MEXICO.

JAW-TRAP.

SPECIFICATION forming part of Letters Patent No. 430,231, dated June 17, 1890.

Application filed April 12, 1890. Serial No. 347,673. (No model.)

*To all whom it may concern:*

Be it known that I, GEORG HOLLER, a citizen of the United States, residing at Blossburg, in the county of Colfax and Territory of New Mexico, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in animal-traps of that class known as "jaw-traps," and has for its object to impale and hold the animal between its jaws with such force as to kill or capture him.

To this end the invention consists in the novel construction and combination of parts, as will be hereinafter more particularly described, and pointed out in the appended claim.

Figure 1:
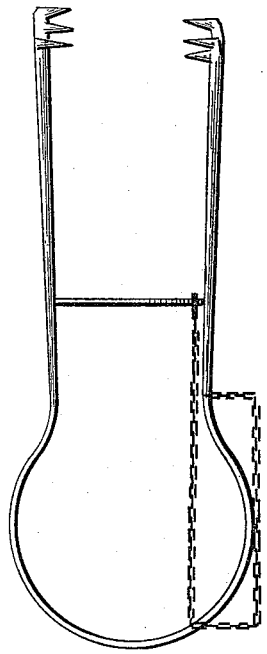
Figure 3:
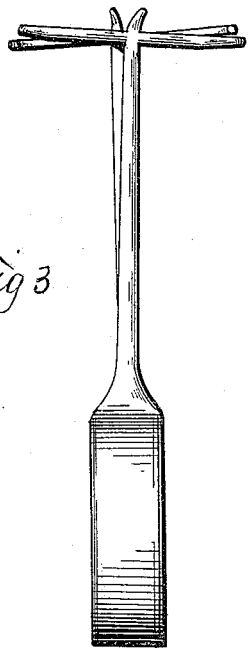
Figure 2:
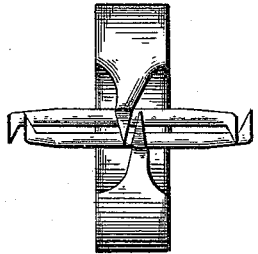
Figure 4:
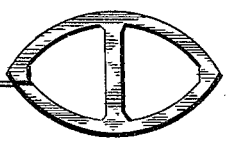

In the accompanying drawings, to which reference is had, and which fully illustrate my invention, Figure 1 is a side elevation of my improved trap set for catching an animal. Fig. 2 is an end view of the trap in its normal position. Fig. 3 is a front elevation, and Fig. 4 is a view of the trigger detached.

Similar letters of reference indicate corresponding parts in all the figures.

In the drawings, A and A' indicate the legs of the trap, which are made of smooth round steel or other suitable metal, formed larger at their lower ends and gradually tapering off smaller at their upper ends, terminating in two transverse parallel jaws $a\ a$, the free ends of which and the free ends of the legs or arms being provided with teeth or prongs $a'\ a'\ a'$, "struck up" at right angles to the plane of said jaws and projecting inwardly toward and meshing with each other, thus forming upon the upper ends of the legs a pair of cruciform jaws, upon the teeth of which, when the trap is sprung, by means of a spring hereinafter described, the rodent is impaled. The larger and lower ends of the legs terminate in a strong plate-spring C, which, when the trap is sprung, forces the jaws together, one of which, being located very slightly below the other, with great power, and, as above stated, the teeth upon the jaws impaling the rodent securely thereon and between the said jaws.

To the leg A' is attached, by means of a ring $c$ and chain $c'$, a skeleton trigger or oval-shaped metallic piece D, which may be inserted edgewise between the legs or arms A A' on its widest central part, midway between the jaws and spring, or, rather, a little nearer the spring than the jaws, which holds the latter wide open, and thus sets the trap. The trap when thus set is then placed in a gopher or any animal hole and is ready for its victim. In order for the animal to get out of his hole he must necessarily move the trigger, (only through and around which he can see daylight,) the slightest touch or pressure upon which will cause its slipping off from and out of its position between the legs, and consequently cause the jaws to snap together in an instant and impale the rodent upon the teeth thereof and between the same.

My device is simple in its construction, durable, and cheap to manufacture.

Having thus described my invention, what I claim as new, and desire to secure by Letters Patent, is—

A jaw-trap comprising a flat spring doubled upon itself and terminating in two integral arms or stems, the points of which are bent inwardly at right angles to serve as engaging teeth, and straight transverse bars or jaws on said ends, also provided with teeth, and a separate trigger-piece which is interposed at a point along the arms to set the trap, substantially as described.

In testimony whereof I affix my signature in presence of two witnesses.

GEORG HOLLER.

Witnesses:
C. C. BERINGER,
WM. C. WRIGLEY.